(12) United States Patent
Sridhar et al.

(10) Patent No.: US 9,775,072 B2
(45) Date of Patent: Sep. 26, 2017

(54) MODIFYING PARAMETERS OF A WIRELESS ACCESS NODE

(71) Applicant: Alcatel-Lucent USA Inc., Murray Hill, NJ (US)

(72) Inventors: Kamakshi Sridhar, Plano, TX (US); Ashok Rudrapatna, Basking Ridge, NJ (US); Anil Rao, Redmond, WA (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 238 days.

(21) Appl. No.: 14/502,328

(22) Filed: Sep. 30, 2014

(65) Prior Publication Data

US 2016/0095126 A1 Mar. 31, 2016

(51) Int. Cl.
*H04W 28/08* (2009.01)
*H04W 24/02* (2009.01)
*H04W 28/18* (2009.01)

(52) U.S. Cl.
CPC ............ *H04W 28/08* (2013.01); *H04W 24/02* (2013.01); *H04W 28/18* (2013.01)

(58) Field of Classification Search
None
See application file for complete search history.

(56) References Cited

U.S. PATENT DOCUMENTS

| 2011/0038334 | A1* | 2/2011 | Huang | H04W 72/04 370/329 |
| 2011/0267944 | A1* | 11/2011 | Stjernholm | H04L 47/824 370/230 |
| 2013/0051332 | A1* | 2/2013 | Sridhar | H04W 48/06 370/329 |
| 2013/0301602 | A1* | 11/2013 | Uchino | H04W 72/14 370/329 |
| 2014/0204741 | A1* | 7/2014 | Ookubo | H04W 72/0486 370/230 |
| 2015/0036563 | A1* | 2/2015 | Hurd | H04W 72/1252 370/281 |

(Continued)

FOREIGN PATENT DOCUMENTS

SE 2013/172754 A1 * 11/2013 ............ H04W 76/02

*Primary Examiner* — Jeffery M Rutkowski
*Assistant Examiner* — Ning Li
(74) *Attorney, Agent, or Firm* — Tong, Rea, Bentley & Kim, LLC

(57) ABSTRACT

A capability for modifying parameters of a wireless access node is provided. The capability for modifying parameters of a wireless access node may support use of parameter monitoring and computation functions to jointly improve or optimize capacity for voice and data users in wireless networks. The capability for modifying parameters of a wireless access node may include detecting a trigger event associated with the wireless access node, modifying a signal-to-interference-and-noise ratio (SINR) threshold of the wireless access node responsive to the trigger event, modifying a call admission control (CAC) threshold of the wireless access node based on evaluation of a parameter associated with modification of the SINR threshold of the wireless access node, and further modifying the CAC threshold of the wireless access node based on evaluation of a parameter associated with modification of the CAC threshold of the wireless access node.

8 Claims, 4 Drawing Sheets

(56) References Cited

U.S. PATENT DOCUMENTS

2015/0117344 A1* 4/2015 Arvidsson ........... H04W 76/027
370/329
2015/0304978 A1* 10/2015 Bhanage ............... H04W 24/02
370/236

* cited by examiner

US 9,775,072 B2

MODIFYING PARAMETERS OF A WIRELESS ACCESS NODE

TECHNICAL FIELD

The disclosure relates generally to wireless communication networks and, more specifically but not exclusively, to modifying parameters of a wireless access node of a wireless communication network.

BACKGROUND

In various types of wireless access nodes of various types of wireless communication networks, there may be tradeoffs between resources and performance, such as between control channel capacity, bearer channel capacity, handover performance, delay, and the like. For example, in Evolved NodeBs (eNodeBs) of Long Term Evolution (LTE) wireless networks, there may be tradeoffs between Physical Downlink Control Channel (PDCCH) capacity, Physical Downlink Shared Channel (PDSCH) capacity and Physical Uplink Shared Channel (PUSCH) capacity, the number of voice-over-LTE (VoLTE) users supported, the number of guaranteed bit rate (GBR) users supported, handover performance, and delay. Similarly, there may be comparable tradeoffs, or other types of tradeoffs, for other types of wireless access nodes of other types of wireless communication networks. As such, it is advantageous to support management of tradeoffs for wireless access nodes of wireless communication networks.

SUMMARY OF EMBODIMENTS

Various deficiencies in the prior art may be addressed by embodiments for modifying parameters of a wireless access node.

In at least some embodiments, an apparatus includes a processor and a memory communicatively connected to the processor. The processor is configured to detect a trigger event associated with a wireless access node. The processor is configured to modify a signal-to-interference-and-noise ratio (SINR) threshold of the wireless access node responsive to the trigger event.

The processor is configured to determine, based on evaluation of a parameter associated with modification of the SINR threshold of the wireless access node, whether to modify a call admission control (CAC) threshold of the wireless access node.

In at least some embodiments, a method includes detecting, via a processor, a trigger event associated with a wireless access node, modifying a signal-to-interference-and-noise ratio (SINR) threshold of the wireless access node responsive to the trigger event, and determining, based on evaluation of a parameter associated with modification of the SINR threshold of the wireless access node, whether to modify a call admission control (CAC) threshold of the wireless access node.

In at least some embodiments, a non-transitory computer-readable storage medium stores instructions which, when executed by a computer, cause the computer to perform a method that includes detecting a trigger event associated with a wireless access node, modifying a signal-to-interference-and-noise ratio (SINR) threshold of the wireless access node responsive to the trigger event, and determining, based on evaluation of a parameter associated with modification of the SINR threshold of the wireless access node, whether to modify a call admission control (CAC) threshold of the wireless access node.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements common to the figures.

DETAILED DESCRIPTION OF EMBODIMENTS

In general, a capability for modifying or adjusting parameters of a wireless access node in a wireless network is provided. In at least some embodiments, the capability for modifying parameters of a wireless access node may support use of parameter monitoring and computation functions to jointly improve or optimize capacity for voice and data users in wireless networks (e.g., Third Generation (3G) Universal Mobile Telecommunications System (UMTS) wireless networks, Long Term Evolution (LTE) wireless networks, LTE-advanced wireless networks, or the like). In at least some embodiments, the capability for modifying parameters of a wireless access node may include detecting a trigger event associated with the wireless access node, modifying a signal-to-interference-and-noise ratio (SINR) threshold of the wireless access node responsive to the trigger event, and determining, based on evaluation of a parameter associated with modification of the SINR threshold of the wireless access node, whether to modify a call admission control (CAC) threshold of the wireless access node. These and various other embodiments and advantages of the capability for modifying parameters of a wireless access node may be better understood when considered within the context of an exemplary wireless communication system including an exemplary wireless access node, as depicted in FIG. 1.

Figure 1:
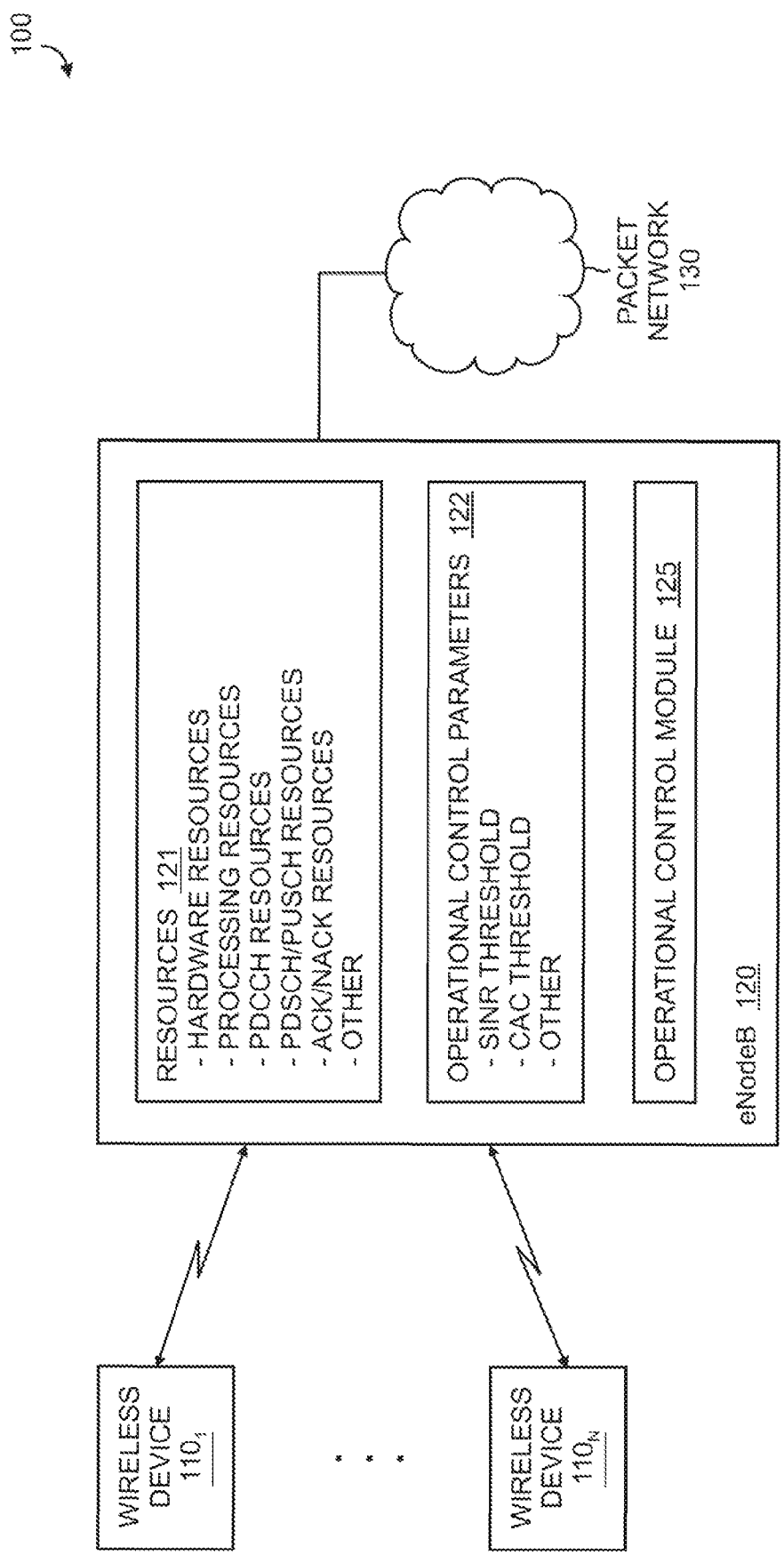
FIG. 1 depicts an exemplary wireless communication system including a wireless access node including resources and supporting parameters which may be modified to control use of the resources of the wireless access node.

FIG. 1 depicts an exemplary wireless communication system including a wireless access node including resources and supporting parameters which may be modified to control use of the resources of the wireless access node.

The wireless communication system 100 of FIG. 1 is a Long Term Evolution (LTE) based wireless communication system. It will be appreciated that, although primarily depicted and described within the context of the LTE-based wireless communication system 100 of FIG. 1, various embodiments depicted and described herein within the context of FIG. 1 may be applied to or adapted for use in various other types of wireless communication systems (e.g., 3G UMTS wireless communication systems, LTE-advanced wireless communication systems, or the like).

The wireless communication system 100 includes a set of wireless devices $110_1$-$110_N$ (collectively, wireless devices 110), an Evolved NodeB (eNodeB) 120, and a packet network 130. The eNodeB 120 is configured to operate as a wireless access point for wireless devices 110, facilitating communications between the wireless devices 110 and the packet network 130. The packet network 130 is configured to support communications via eNodeB 120. For example, packet network 130 may include a backhaul portion of an LTE access network with which eNodeB 120 is associated, an LTE Evolved Packet Core (EPC) network, one or more data networks which may be communicatively connected to the EPC network (e.g., the Internet, one or more private data networks, or the like), or the like, as well as various combinations thereof.

The wireless devices 110 may include any suitable types of wireless devices which may communicate wirelessly via eNodeB 120 (e.g., cellular phones, smartphones, tablet computers, laptop computers, Internet of Things (IoT) devices, or the like). The wireless devices 110 may communicate via eNodeB 120 using Radio Access Bearers (RABs), which also may be referred to more generally herein as bearers or sessions. The wireless devices 110 may utilize guaranteed bit rate (GBR) bearers (in which case the wireless devices 110 may also then be referred to as LTE GBR devices or LTE GBR users), non-GBR bearers (in which case the wireless devices 110 may also then be referred to as LTE non-GBR devices or LTE non-GBR users), or the like, as well as various combinations thereof. It will be understood that the GBR bearers may transport voice (in which case the wireless devices 110 may also then be referred to as voice-over-LTE (VoLTE) devices or VoLTE users), data, or the like.

The eNodeB 120 is a wireless access node configured to support wireless communications for wireless devices 110.

The eNodeB 120 may support various types of communications by wireless device 110. As discussed above, for example, eNodeB 120 may support VoLTE bearers (e.g., wireless devices 110 with VoLTE sessions via eNodeB 120), GBR data bearers (e.g., wireless devices 110 with GBR data sessions via eNodeB 120), non-GBR data bearers (e.g., wireless devices 110 with non-GBR data sessions (e.g., best effort (BE sessions) via eNodeB 120), or the like.

The eNodeB 120 may be configured to support scheduling of downlink and uplink transmissions using dynamic scheduling (DS) or semi-persistent scheduling (SPS). In general, DS schedules each downlink and uplink transmission separately and, thus, is well-suited for bursty and bandwidth consuming data transmissions (e.g., web surfing, video streaming, and so forth). In general, SPS schedules uplink and downlink transmissions based on scheduling of a transmission pattern that is to be repeated (e.g., certain parameters (e.g., radio bearer (RB) assignments, Modulation and Coding Scheme (MSC), and so forth) remain fixed for each allocation and repeat according to a pre-configured periodicity for each allocation) and, thus, is well-suited for real-time streaming applications (e.g., voice calls or other similar types of transmissions). It will be appreciated that use of SPS rather than DS will reduce the scheduling assignment overhead. It is noted that, although SPS is well-suited for voice calls, eNodeB 120 may be use DS or SPS for voice bearers, and that there are various tradeoffs associated therewith as discussed further below.

The eNodeB 120 includes various resources 121 for supporting communications by wireless devices 110. The resources 121 may include hardware resources, processing resources, Physical Downlink Control Channel (PDCCH) resources (which may be referred to more generally herein as control channel resources), Physical Downlink Shared Channel (PDSCH) resources (which may be referred to more generally herein as downlink bearer resources), Physical Uplink Shared Channel (PUSCH) resources (which may be referred to more generally herein as uplink bearer resources), acknowledgement (ACK) and negative acknowledgment (NACK) resources, or the like, as well as various combinations thereof. The PDCCH carries allocation information for both the PDSCH and the PUSCH in the form of Downlink Control Information (DCI), and the size of the DCI may depend on various factors (e.g., whether the DCI is for uplink allocation or downlink allocation, or the like). The PDSCH resources and PUSCH resources may be in the form of Physical Resource Blocks (PRBs). The typical usage of resources of an eNodeB will be understood by one skilled in the art.

The resources 121 of eNodeB 120 may have various constraints associated therewith. The eNodeB 120 has hardware constraints on types of bearers which may be supported (e.g., hardware constraints on the number of SPS bearers which may be supported by the eNodeB 120 due to scheduling grants that must persist for a certain duration of time). The eNodeB 120 has constraints on PDCCH resource usage, which is constrained by the PDCCH capacity supported by the eNodeB 120. The constraint on PDCCH resource usage impacts the number of bearers which may be supported by the eNodeB 120. The constraints on PDCCH resource usage may be based on processing resources of eNodeB 120, which constraints the PDCCH capacity which may be supported by the eNodeB 120. In the case of SPS bearers rather than DS bearers, as discussed above, certain parameters remain fixed for each allocation and, thus, SPS supports more bearer allocations than DS given the same amount of PDCCH resources. The eNodeB 120 has constraints on the number of PDSCH PRBs available for supporting downlink transmissions and constraints on the number of PUSCH PRBs available for supporting uplink transmissions. The eNodeB 120 has constraints on the number of acknowledgments and negative acknowledgements (ACKs/NACKs) that may be supported. The eNodeB 120 may have other constraints on resources 121 of eNodeB 120, other constraints on other types of resources of eNodeB 120, or the like.

The eNodeB 120 supports a set of operational control parameters 122 which eNodeB 120 may control in order to control operation of eNodeB 120. For example, the operational control parameters 122 may include an SINR threshold of the eNodeB 120, a CAC threshold of the eNodeB 120, or the like, as well as various combinations thereof. The eNodeB 120 may use the operational control parameters 122 to control use of the resources 121 for supporting communications by wireless devices 110. The eNodeB 120 may modify operational control parameters 122 in a manner tending to satisfy, or at least attempting to satisfy, one or more operational requirements or goals of the eNodeB 120 (e.g., capacity requirements or goals, performance requirements or goals, or the like, as well as various combinations thereof). The eNodeB 120 may fine tune the operational control parameters 122 to dynamically trade off capacity and performance in a dynamic traffic and mobility environment.

The eNodeB 120 may be configured to modify the SINR threshold of the eNodeB 120. The modification of the SINR threshold of the eNodeB 120 allows the eNodeB 120 to control the number of SPS bearers supported by the eNodeB 120 and the number of DS bearers supported by the eNodeB 120. For example, the eNodeB 120 may be configured to decrease the SINR threshold in order to increase the number of SPS bearers supported by the eNodeB 120 and decrease the number of DS bearers supported by the eNodeB 120 (as more bearers are then considered to have SINRs adequate to satisfy the SINR threshold required for use of SPS), which will result in an increase in the amount of PDCCH capacity available on the eNodeB 120 (since SPS bearers use less PDCCH resources than DS bearers as discussed above), thereby enabling additional bearers to be served by the eNodeB 120. Similarly, for example, the eNodeB 120 may be configured to increase the SINR threshold in order to decrease the number of SPS bearers supported by the eNodeB 120 and increase the number of DS bearers supported by the eNodeB 120 (as less bearers are then considered to have SINRs adequate to satisfy the SINR threshold required for use of SPS), which will result in a decrease in the amount of PDCCH capacity available on the eNodeB 120 (since DS bearers use more PDCCH resources than SPS bearers as discussed above), thereby reducing the number of bearers which may be served by the eNodeB 120 (although also improving other aspects of the operation of eNodeB 120, as discussed further below). Additionally, it is noted that, while SPS is more efficient than DS for PDCCH resources of the eNodeB 120, DS typically is more efficient than SPS for the PDSCH/PUSCH resources of the eNodeB 120 and, thus, eNodeB 120 may be configured to balance these two factors in order to improve or optimize bearer capacity of the eNodeB 120.

The eNodeB 120 may be configured to modify the CAC threshold of the eNodeB 120. The modification of the CAC threshold of the eNodeB 120 allows eNodeB 120 to modify at least one of the number of wireless devices 110 supported by eNodeB 120 or the number of bearers of wireless devices 110 supported by the eNodeB 120. Here, the CAC threshold may represent a barrier to entry of new wireless devices 110 or bearers of wireless devices 110 on the eNodeB 120, such that increasing the CAC threshold of eNodeB 120 enables fewer wireless devices 110 or bearers of wireless devices 110 to be supported by eNodeB 120 and decreasing the CAC threshold of eNodeB 120 enables more wireless devices 110 or bearers of wireless devices 110 to be supported by eNodeB 120. For example, the eNodeB 120 may be configured to decrease the CAC threshold in order to increase the total number of bearers supported by the eNodeB 120, which will result in an increase in the amount of PDCCH capacity consumed on the eNodeB 120 (irrespective of whether newly admitted bearers are SPS bearers or DS bearers, since both types of bearers will use as least some of the PDCCH resources of eNodeB 120). Similarly, for example, the eNodeB 120 may be configured to increase the CAC threshold in order to decrease the total number of bearers supported by the eNodeB 120, which will result in a decrease in the amount of PDCCH capacity consumed on the eNodeB 120. It will be appreciated that the CAC threshold of eNodeB 120 may be defined in other ways and may take into account one or more other parameters.

The eNodeB 120 includes an operational control module 125 that is configured to control modification of the operational control parameters 122 in a manner tending to satisfy, or at least attempting to satisfy, one or more operational requirements or goals of the eNodeB 120 (e.g., capacity requirements or goals, performance requirements or goals, or the like, as well as various combinations thereof). An exemplary embodiment of a method which may be executed by the operational control module 125 of eNodeB 120 in order to satisfy or optimize one or more operational requirements or goals of eNodeB 120 is depicted and described with respect to FIG. 2.

It will be appreciated that, although primarily depicted and described within the context of embodiments in which wireless communication system 100 is an LTE-based communication system (including eNodeB 120 as a wireless access node), various embodiments depicted and described herein may be applied to or adapted for use in various other types of wireless communication systems which may include various other types of wireless access nodes (e.g., NodeBs, base stations, or the like). Accordingly, in various embodiments, references herein to eNodeB 120 may be read more generally as references to a wireless access node and, similarly, references herein to various other LTE-specific elements and terms also may be read more generally.

Figure 2:
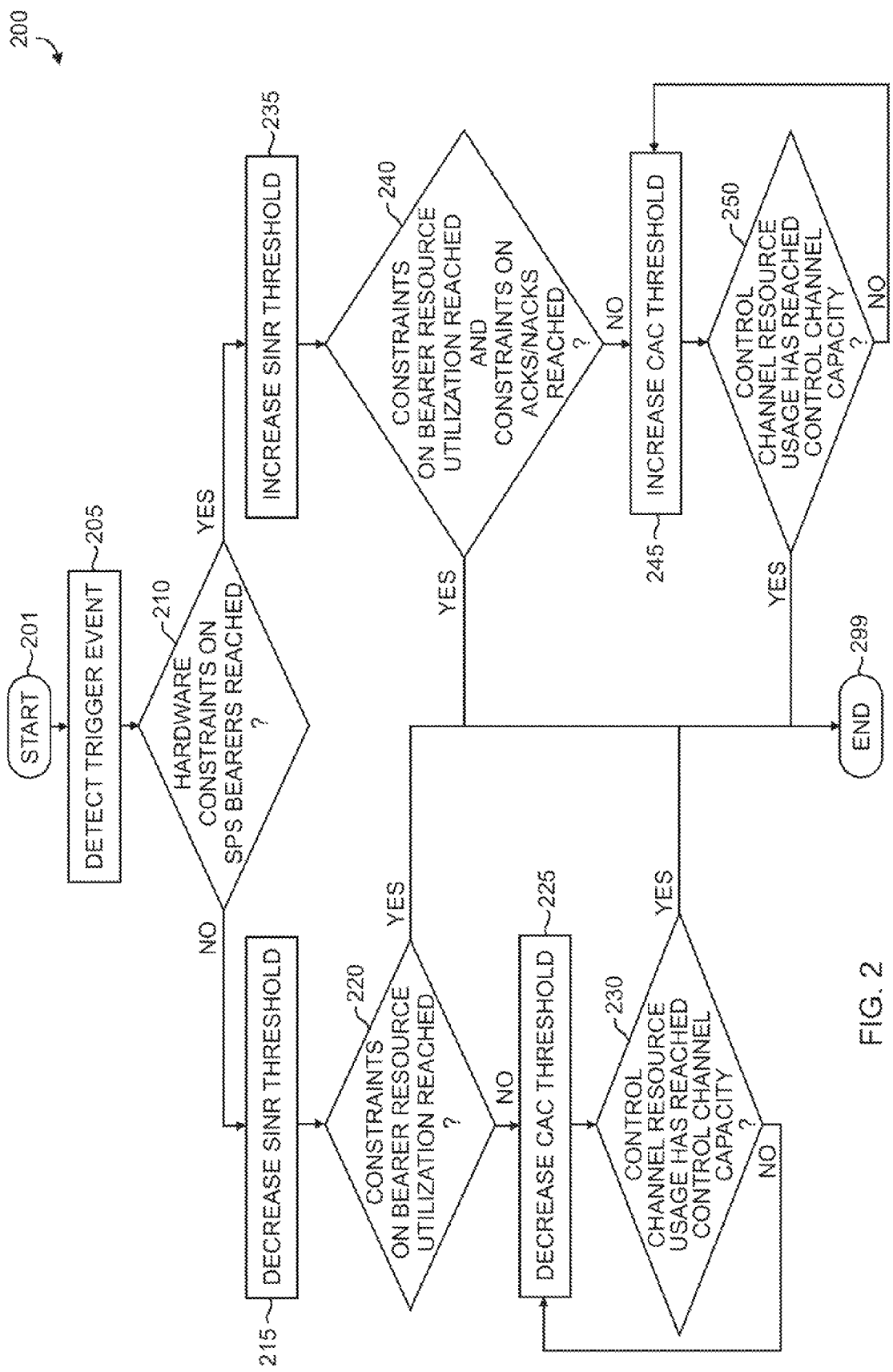
FIG. 2 depicts an exemplary embodiment of a method for modifying parameters of a wireless access node to control use of resources of the wireless access node.

FIG. 2 depicts an exemplary embodiment of a method for modifying parameters of a wireless access node to control use of resources of the wireless access node.

It will be appreciated that method 200 for modifying parameters of a wireless access node to control use of resources of the wireless access node is described more generally to cover embodiments in which the wireless access node may be an eNodeB (such as eNodeB 120 of FIG. 1) or may be a different type of wireless access node; however, method 200 still includes descriptions specific to controlling LTE-specific resources of an eNodeB in order to provide examples related to embodiments in which the wireless access node is an eNodeB.

It will be appreciated that, although primarily presented herein as being performed serially, at least a portion of the steps of method 200 may be performed contemporaneously or in a different order than as presented in FIG. 2.

At step 201, method 200 begins.

At step 205, a trigger event associated with the wireless access node is detected. The trigger event may be an event indicative that a number of wireless devices served by the wireless access node has changed (e.g., by a threshold amount, by a threshold percentage, or the like). The trigger event may be detection that a number of handover events within a certain period of time satisfies a threshold, detection that a number of wireless devices supported by the wireless access node satisfies a threshold, detection that a change in the number of wireless devices supported by the wireless access node satisfies a threshold, detection that a periodic timer has expired, or the like, as well as various combinations thereof. The trigger event may trigger a parameter modification cycle (which also may be referred to herein as an optimization cycle) in which one or more operational control parameters of the wireless access node (e.g., SINR threshold and, optionally, CAC threshold, as discussed further below) may be modified for attempting to satisfy one or more operational requirements or goals of the wireless access node.

At step 210, a determination is made as to whether hardware constraints on SPS bearers have been reached. Based on a determination that hardware constraints on SPS bearers have not been reached, in which case additional SPS bearers may be admitted to the wireless access node, the method 200 proceeds to step 215. Based on a determination that hardware constraints on SPS bearers have been reached, in which case additional SPS bearers may not be admitted to the wireless access node while DS bearers may still be admitted to the wireless access node provided that there is enough control channel capacity (e.g., PDCCH capacity) available, method 200 proceeds to step 235.

At step 215, having determined in step 210 that hardware constraints on SPS bearers have not been reached, the SINR threshold of the wireless access node is decreased. The decreasing of the SINR threshold of the wireless access node enables more SPS bearers to be admitted to the wireless access node and, as a result, additional control channel resources (e.g., PDCCH resources) become available and, thus, additional bearers may be admitted to the wireless access node. From step 215, method 200 proceeds to step 220.

At step 220, a determination is made as to whether constraints on bearer resource utilization (e.g., PUSCH/PDSCH PRB utilization) have been reached. Based on a determination that constraints on bearer resource utilization have been not reached, method 200 proceeds to step 225. Based on a determination that constraints on bearer resource utilization have been reached, even though additional control channel resources (e.g., PDCCH resources) are available, there is insufficient bearer resource availability to support additional bearers on the wireless access node and, thus, method 200 proceeds to step 299 where method 200 ends.

At step 225, the CAC threshold of the wireless access node is decreased and, as a result, additional bearers may be granted access to the wireless access node. From step 225, method 200 proceeds to step 230. At step 230, a determination is made as to whether control channel resource usage of the wireless access node has reached a control channel capacity supported by the wireless access node (e.g., PDCCH usage has reached a PDCCH capacity). The control channel capacity supported by the wireless access node may be dependent on processing resources of the wireless access node. Based on a determination that the control channel resource usage of the wireless access node has reached the control channel capacity supported by the wireless access node, method 200 proceeds to step 299 where method 200 ends. Based on a determination that the control channel resource usage of the wireless access node has not reached the control channel capacity supported by the wireless access node, method 200 returns to step 225, at which point the CAC threshold is decreased again as there is still sufficient control channel capacity to support additional bearers on the wireless access node. The CAC threshold of the wireless access node may be decreased in increments, decreased dynamically based on one or more factors (e.g., availability of control channel capacity before control channel capacity is deemed to be within limits), or the like. This loop through steps 225 and 230 may continue until a determination is made at step 230 that the control channel resource usage of the wireless access node has reached the control channel capacity supported by the wireless access node, at which point (as noted above) method 200 proceeds to step 299 where method 200 ends.

At step 235, having determined in step 210 that hardware constraints on SPS bearers have been reached, the SINR threshold of the wireless access node is increased. The increase in the SINR threshold of the wireless access node decreases the number of SPS bearers on the wireless access node and increases the number of DS bearers on the wireless access node. From step 235, method 200 proceeds to step 240.

At step 240, a determination is made as to whether constraints on bearer resource utilization (e.g., PUSCH/PDSCH PRB utilization) have been reached and/or a determination is made as to whether constraints on ACKs/NACKs have been reached. Based on a determination that constraints on bearer resource utilization have not been reached or based on a determination that constraints on ACKs/NACKs have not been reached (which, it will be appreciated, indicates that both determinations do not always need to be evaluated since a determination that one of the two determinations is not satisfied may obviate a need to evaluate the other of the two determinations), method 200 proceeds to step 245. Based on a determination that constraints on bearer resource utilization have been reached and based on a determination that constraints on ACKs/NACKs have been reached, method proceeds to step 299 where method 200 ends.

At step 245, the CAC threshold of the wireless access node is increased and, as a result, fewer bearers may be granted access to the wireless access node. The increase in the SINR threshold of the wireless access node results in an increase in DS bearers on the wireless access node and, as a result, additional control channel capacity (e.g., PDCCH capacity) of the wireless access node is used such that less control channel capacity is available. The increase in the CAC threshold allows fewer bearers (including BE bearers) to access the wireless access node, thereby ensuring that control channel resources (e.g., PDCCH grants) are available to support the existing bearers on the wireless access node. It is noted that, if the control channel capacity (e.g., PDCCH capacity) of the wireless access node is exhausted, existing bearers could be dropped. From step 245, method 200 proceeds to step 250. At step 250, a determination is made as to whether control channel resource usage of the wireless access node has reached a control channel capacity supported by the wireless access node (e.g., PDCCH usage has reached a PDCCH capacity). The control channel capacity supported by the wireless access node may be dependent on processing resources of the wireless access node. Based on a determination that the control channel resource usage of the wireless access node has reached the control channel capacity supported by the wireless access node, method 200 proceeds to step 299 where method 200 ends. Based on a determination that the control channel resource usage of the wireless access node has not reached the control channel capacity supported by the wireless access node, method 200 returns to step 245, at which point the CAC threshold is increased again. The CAC threshold of the wireless access node may be increased in increments, increased dynamically based on one or more factors (e.g., availability of control channel capacity before control channel capacity is deemed to be within limits\), or the like. This loop through steps 245 and 250 may continue until a determination is made at step 250 that the control channel resource usage of the wireless access node has reached the control channel capacity supported by the wireless access node, at which point (as noted above) method 200 proceeds to step 299 where method 200 ends.

At step 299, method 200 ends.

It will be appreciated that, although primarily depicted and described as with respect to embodiments in which certain conditions cause method 200 to proceed to step 299 where method 200 ends, in at least some embodiments one or more of the conditions may trigger other types of processing to be performed as part of the parameter modification cycle for the wireless access node. In at least some embodiments, for example, method 200, rather than proceeding from step 230 to step 299 when control channel capacity is reached responsive to one or more decreases of the CAC threshold at step 225, may return to step 210 to determine whether hardware constraints on SPS bearers have been reached (and, thus, whether further modification of the SINR threshold of the wireless access node is to be performed). In at least some embodiments, for example, method 200, rather than proceeding from step 250 to step 299 when control channel capacity limits are reached responsive to one or more increases of the CAC threshold at step 245, may return to step 210 to determine whether hardware constraints on SPS bearers have been reached (and, thus, whether further modification of the SINR threshold of the wireless access node is to be performed). It will be appreciated that other modifications may be made in order to enable the wireless access node to modify tunable parameters of the wireless access node for controlling use of resources of the wireless access node and, thus, satisfying or optimizing one or more operational requirements or goals of the wireless access node.

It will be appreciated that, although primarily depicted and described as ending, method 200 or portions of method 200 may continue to be executed or may be re-executed to perform a next parameter modification cycle for the wireless access node responsive to detection of a next trigger event.

It will be appreciated that, although primarily depicted and described with respect to embodiments in which method 200 is performed by the wireless access node to modify tunable parameters of the wireless access node in order to control use of resources of the wireless access node, in at least some embodiments at least a portion of the steps of method 200 may be performed by one or more other elements (e.g., a wireless network controller serving the wireless access node and one or more other wireless access nodes, a management system, or the like) and associated control information may be provided from the one or more other elements to the wireless access node for use by the wireless access node in modifying tunable parameters of the wireless access node in order to control use of resources of the wireless access node.

Figure 3:
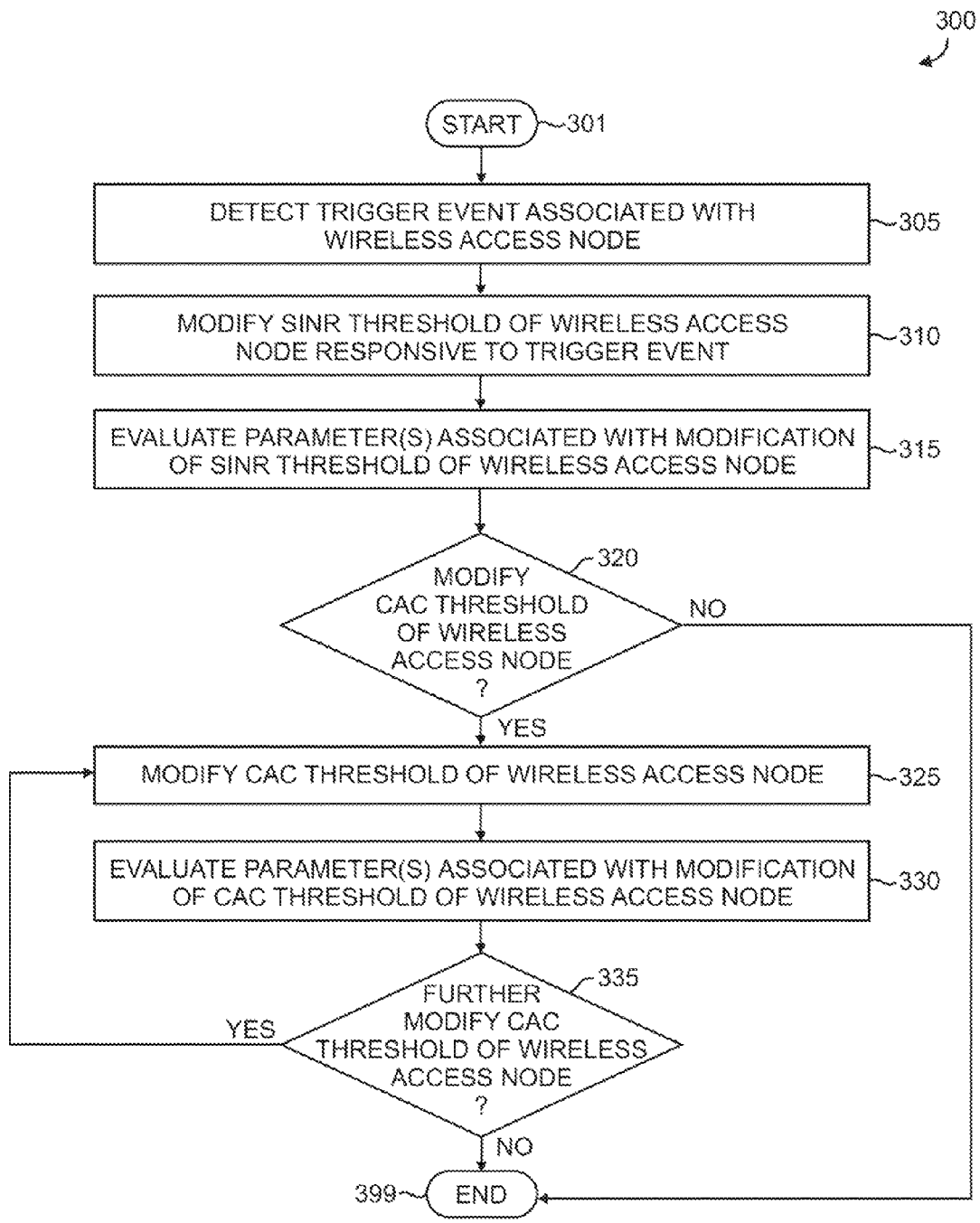
FIG. 3 depicts an exemplary embodiment of a method for modifying parameters of a wireless access node to control use of resources of the wireless access node.

FIG. 3 depicts an exemplary embodiment of a method for modifying parameters of a wireless access node to control use of resources of the wireless access node. It will be appreciated that, although primarily presented herein as being performed serially, at least a portion of the steps of method 300 may be performed contemporaneously or in a different order than as presented in FIG. 3.

At step 301, method 300 begins.

At step 305, a trigger event associated with the wireless access node is detected. The trigger event may be an event indicative that a number of wireless devices served by the wireless access node has changed (e.g., by a threshold amount, by a threshold percentage, or the like). The trigger event may be detection that a number of handover events within a certain period of time satisfies a threshold, detection that a number of wireless devices supported by the wireless access node satisfies a threshold, detection that a change in the number of wireless devices supported by the wireless access node satisfies a threshold, detection that a periodic timer has expired, or the like, as well as various combinations thereof. The trigger event may trigger a parameter modification cycle in which one or more control parameters of the wireless access node (e.g., SINR threshold and, optionally, CAC threshold, as discussed further below) may be modified for attempting to satisfy one or more operational requirements or goals of the wireless access node.

At step 310, an SINR threshold of the wireless access node is modified responsive to the trigger event. The SINR threshold of the wireless access node may be modified based on a determination as to whether hardware constraints on SPS bearers have been reached. The SINR threshold of the wireless access node may be decreased based on a determination that hardware constraints on SPS bearers have not been reached or increased based on a determination that hardware constraints on SPS bearers have been reached.

At step 315, a parameter(s) associated with modification of the SINR threshold of the wireless access node is evaluated. The parameter(s) that is evaluated may be based on whether the SINR threshold of the wireless access node is decreased or increased. For example, responsive to a decrease in the SINR threshold of the wireless access node, a constraint(s) on bearer resource utilization may be evaluated to determine whether the constraint(s) on bearer resource utilization has been reached. For example, responsive to an increase in the SINR threshold of the wireless access node, a constraint(s) on bearer resource utilization may be evaluated to determine whether the constraint(s) on bearer resource utilization has been reached and/or a constraint(s) on ACKs/NACKs may be evaluated to determine whether the constraint(s) on ACKs/NACKs has been reached.

At step 320, a determination is made, based on evaluation of the parameter(s) associated with modification of the SINR threshold of the wireless access node, as to whether to modify the CAC threshold of the wireless access node. Based on a determination not to modify the CAC threshold of the wireless access node, method 300 proceeds to step 399 where method 300 ends. Based on a determination to modify the CAC threshold of the wireless access node, method 300 proceeds to step 325.

At step 325, the CAC threshold of the wireless access node is modified. The CAC threshold of the wireless access node may be decreased, following a decrease in the SINR threshold of the wireless access node, based on a determination that a constraint(s) on bearer resource utilization of the wireless access node has not been reached. The CAC threshold of the wireless access node may be increased, following an increase in the SINR threshold of the wireless access node, based on a determination that a constraint(s) on bearer resource utilization of the wireless access node has not been reached and a determination that a constraint(s) on ACKs/NACKs has not been reached.

At step 330, a parameter(s) associated with modification of the CAC threshold of the wireless access node is evaluated. The parameter(s) that is evaluated may be a control channel capacity of the wireless access node.

At step 335, a determination is made, based on evaluation of the parameter(s) associated with modification of the CAC threshold of the wireless access node, as to whether to further modify the CAC threshold of the wireless access node. Based on a determination not to further modify the CAC threshold of the wireless access node, method 300 proceeds to step 399 where method 300 ends. Based on a determination to further modify the CAC threshold of the wireless access node, method 300 returns to step 325. The CAC threshold of the wireless access node may be further decreased, following a previous decrease in the CAC threshold of the wireless access node, based on a determination that a control channel resource usage of the wireless access node has not reached a control channel capacity of the wireless access node. The CAC threshold of the wireless access node may be further increased, following a previous increase in the CAC threshold of the wireless access node, based on a determination that a control channel resource usage of the wireless access node has not reached a control channel capacity of the wireless access node.

At step 399, method 300 ends.

Various embodiments of the capability for modifying parameters of a wireless access node may provide various advantages. In at least some embodiments, the capability for modifying parameters of a wireless access node may jointly improve or optimize capacity for voice and data users in wireless networks. In at least some embodiments, the capability for modifying parameters of a wireless access node may automate the wireless access node parameter settings such that improved or optimized performance is realized for both voice users and GBR data users with the available resources of the wireless access node. In at least some embodiments, the capability for modifying parameters of a wireless access node may allow improved or optimized utilization of spectral interface resources of the wireless access node, while also supporting improved or optimized quality-of-experience (QoE) for voice and data users, even under congestion scenarios where radio resources are scarce or even approach exhaustion. In at least some embodiments, the capability for modifying parameters of a wireless access node may provide improved or optimized QoE for voice and data users even as the radio spectrum resources become scarcer or approach exhaustion. Various embodiments of the capability for modifying parameters of a wireless access node may provide various other advantages.

Figure 4:
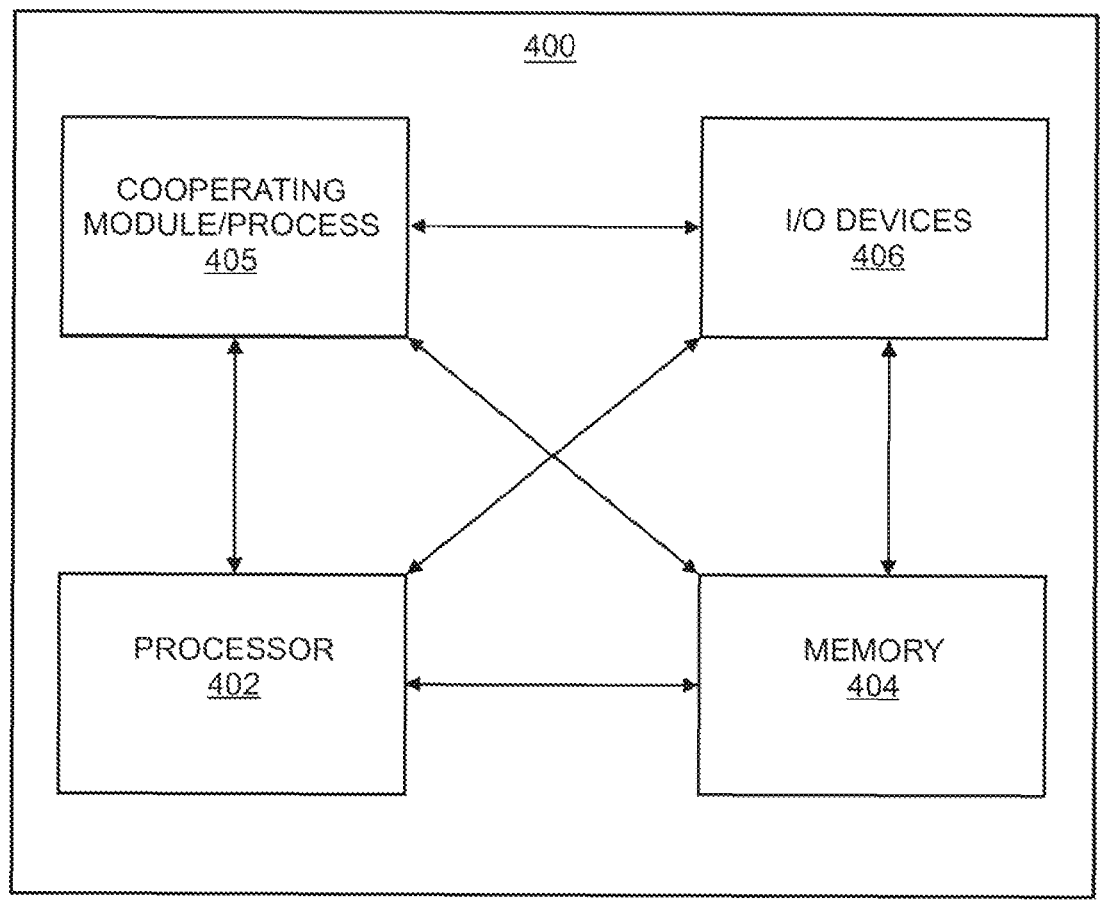
FIG. 4 depicts a high-level block diagram of a computer suitable for use in performing functions described herein.

FIG. 4 depicts a high-level block diagram of a computer suitable for use in performing functions described herein.

The computer 400 includes a processor 402 (e.g., a central processing unit (CPU) and/or other suitable processor(s)) and a memory 404 (e.g., random access memory (RAM), read only memory (ROM), and the like).

The computer 400 also may include a cooperating module/process 405. The cooperating process 405 can be loaded into memory 404 and executed by the processor 402 to implement functions as discussed herein and, thus, cooperating process 405 (including associated data structures) can be stored on a computer readable storage medium, e.g., RAM memory, magnetic or optical drive or diskette, and the like.

The computer 400 also may include one or more input/output devices 406 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 400 depicted in FIG. 4 provides a general architecture and functionality suitable for implementing functional elements described herein and/or portions of functional elements described herein. For example, the computer 400 provides a general architecture and functionality suitable for implementing one or more of a wireless device 110, eNodeB 120, an element of packet network 130, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
detect a trigger event associated with a wireless access node (WAN);
decrease a signal-to-interference-and-noise ratio (SINR) threshold of the WAN responsive to the trigger event based on a determination that a hardware constraint, on a number of bearers of the WAN using semi-persistent scheduling (SPS) for scheduling of bearer resources of the WAN, is not reached;
decrease a call admission control (CAC) threshold of the WAN, responsive to the decrease of the SINR threshold of the WAN, based on a determination that a constraint on bearer resource utilization of the WAN is not reached; and
based on a determination, responsive to the decrease of the CAC threshold of the WAN, that a control channel resource usage of the WAN has not reached a control channel capacity of the WAN, decrease the CAC threshold of the WAN and determine whether the control channel resource usage of the WAN has reached the control channel capacity of the WAN.

2. The apparatus of claim 1, wherein the trigger event comprises at least one of a number of handover events of the WAN satisfying a threshold, a number of wireless devices served by the WAN satisfying a threshold, or expiration of a timer.

3. The apparatus of claim 1, wherein the processor is configured to:
monitor for a next trigger event based on a determination that the control channel resource usage of the WAN has reached the control channel capacity of the WAN.

4. An apparatus, comprising:
a processor and a memory communicatively connected to the processor, the processor configured to:
detect a trigger event associated with a wireless access node (WAN);
increase a signal-to-interference-and-noise ratio (SINR) threshold of the WAN responsive to the trigger event based on a determination that a hardware constraint, on a number of bearers of the WAN using semi-persistent scheduling (SPS) for scheduling of bearer resources of the WAN, is reached;
increase a call admission control (CAC) threshold of the WAN, responsive to the increase of the SINR threshold of the WAN, based on a determination that a constraint on bearer resource utilization of the WAN is not reached or based on a determination that a constraint on a number of acknowledgments and negative acknowledgments of the WAN is not reached; and
based on a determination, responsive to the increase of the CAC threshold of the WAN, that a control channel resource usage of the WAN has not reached a control channel capacity of the WAN, increase the CAC threshold of the WAN and determine whether the control channel resource usage of the WAN has reached the control channel capacity of the WAN.

5. The apparatus of claim 4, wherein the processor is configured to:
monitor for a next trigger event based on a determination that the control channel resource usage of the WAN has reached the control channel capacity of the WAN.

6. The apparatus of claim 4, wherein the trigger event comprises at least one of a number of handover events of the WAN satisfying a threshold, a number of wireless devices served by the WAN satisfying a threshold, or expiration of a timer.

7. A method, comprising:
detecting, by a processor, a trigger event associated with a wireless access node (WAN);
decreasing, by the processor, a signal-to-interference-and-noise ratio (SINR) threshold of the WAN responsive to the trigger event based on a determination that a hardware constraint, on a number of bearers of the WAN using semi-persistent scheduling (SPS) for scheduling of bearer resources of the WAN, is not reached;
decreasing, by the processor, a call admission control (CAC) threshold of the WAN, responsive to the decrease of the SINR threshold of the WAN, based on a determination that a constraint on bearer resource utilization of the WAN is not reached; and
based on a determination, by the processor responsive to the decrease of the CAC threshold of the WAN, that a control channel resource usage of the WAN has not reached a control channel capacity of the WAN, decreasing the CAC threshold of the WAN and determining whether the control channel resource usage of the WAN has reached the control channel capacity of the WAN.

8. A method, comprising:
detecting, by a processor, a trigger event associated with a wireless access node (WAN);
increasing, by the processor, a signal-to-interference-and-noise ratio (SINR) threshold of the WAN responsive to the trigger event based on a determination that a hardware constraint, on a number of bearers of the WAN using semi-persistent scheduling (SPS) for scheduling of bearer resources of the WAN, is reached;
increasing, by the processor, a call admission control (CAC) threshold of the WAN, responsive to the increase of the SINR threshold of the WAN, based on a determination that a constraint on bearer resource utilization of the WAN is not reached or based on a determination that a constraint on a number of acknowledgments and negative acknowledgments of the WAN is not reached; and
based on a determination, by the processor responsive to the increase of the CAC threshold of the WAN, that a control channel resource usage of the WAN has not reached a control channel capacity of the WAN, increasing the CAC threshold of the WAN and determining whether the control channel resource usage of the WAN has reached the control channel capacity of the WAN.

* * * * *